A. BRUNNER.
BALANCE FOR DETERMINING THE TITER OF SILK.
APPLICATION FILED AUG. 23, 1916.
1,271,660.  Patented July 9, 1918.
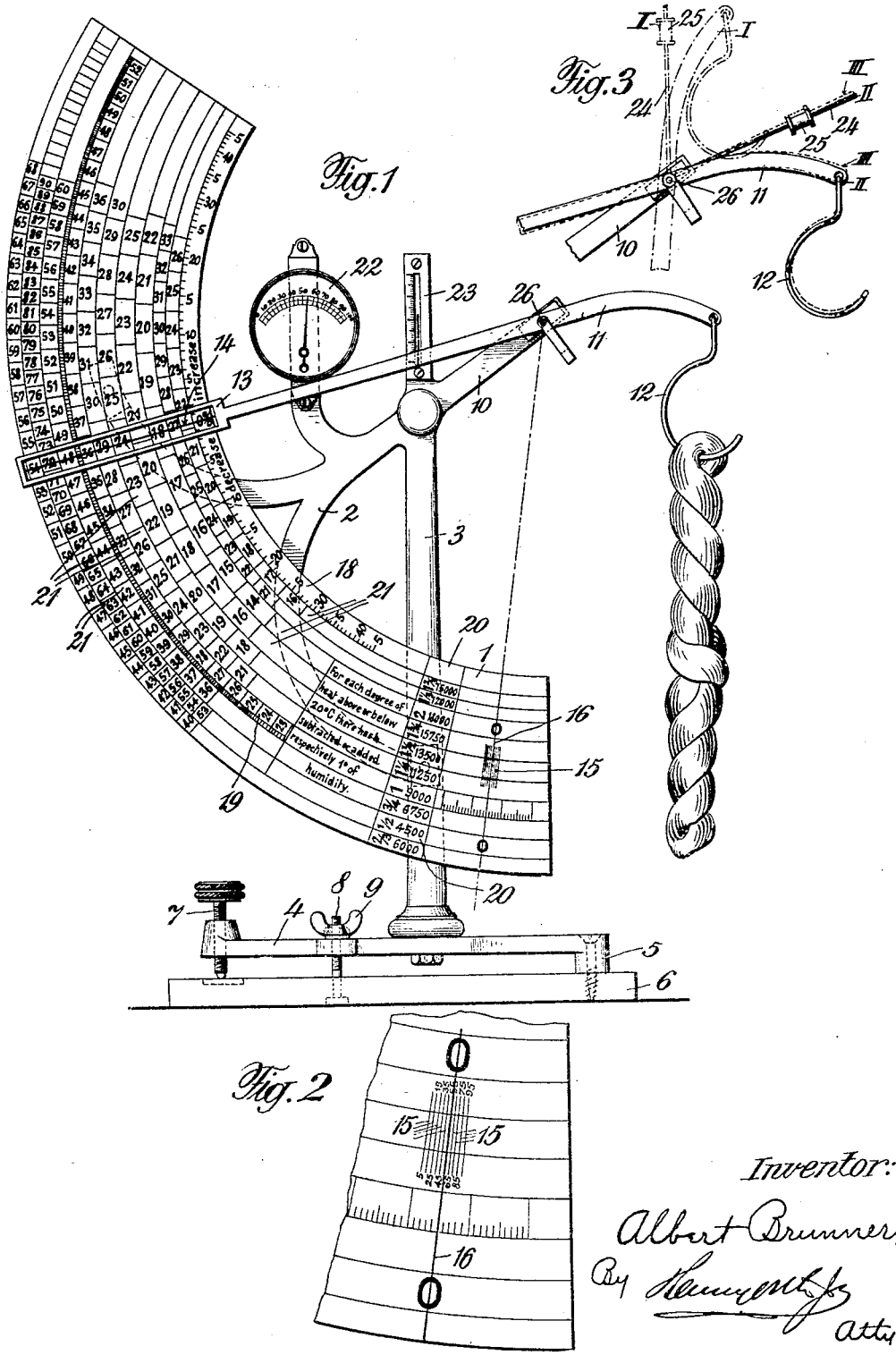
Inventor:
Albert Brunner,
By Hanneworth Jr.
Atty.

UNITED STATES PATENT OFFICE.

ALBERT BRUNNER, OF MÄNNEDORF, SWITZERLAND.

BALANCE FOR DETERMINING THE TITER OF SILK.

1,271,660.  Specification of Letters Patent.  Patented July 9, 1918.

Application filed August 23, 1916. Serial No. 116,569.

*To all whom it may concern:*

Be it known that I, ALBERT BRUNNER, a citizen of the Republic of Switzerland, residing at Männedorf, Canton of Zurich, Switzerland, have invented certain new and useful Improvements in Balances for Determining the Titer of Silk; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a balance for determining the titer or standard of silk.

The balance which forms the subject-matter of my present invention has a pointer adapted to swing over a plurality of parallel scales, each allotted to a determinate skein-length. The division of these scales is thereby such, that the titer or standard may always be read off the scale corresponding to the length of silk in the skein by means of a pointer.

This invention will now be more particularly described with reference to the accompanying drawings, which illustrate a constructional example of the invention. In these drawings:

Figure 1 is a front view of the balance,

Fig. 2 shows a detail thereof and

Fig. 3 shows a modification of a detail.

In carrying this invention into effect as shown in Figs. 1 and 2 I provide an annular segment 1, which is connected to a standard 3 by means of an arm 2. The standard 3 is fixed to a plate 4 connected at 5 to a base-plate 6 by means of screws or the like. An adjusting screw 7 passes through the free end of the plate 4 and rests on the base-plate 6. To the latter is fixed a screw-bolt 8, which traverses the plate 4 between the adjusting screw 7 and the standard 3 and carries a winged nut 9. To an arm 10 of the standard 3 is pivotally mounted a balance beam 11 carrying at one end a hook 12, to which the skeins to be examined may be attached. The other end 13 of this beam 11 is of rectangular form and has a longitudinal slot. Over the latter is stretched a thread 14, which is arranged radially with regard to the pivot of beam 11. The pivot of this beam 11 forms at the same time the center of the annular segment 1 and said rectangular slotted end 13 extends over the whole width of this segment 1.

Near the zero-position of the balance beam 11, which position is indicated on the annular segment 1 by a line 16, are provided on said segment a plurality of mark-lines 15 (Fig. 2) corresponding to certain degrees of humidity of the atmosphere. The annular segment 1 has also a plurality of concentric scales extending in part approximately over the whole length of said segment. Next to the inner edge of the annular segment 1 I provide a scale 18 indicating in % the weight-differences of a skein relatively to the standard weight of 36 grams which is commonly taken as a base. Nearer to the outer edge of the annular segment 1 I provide a scale 19, which indicates the titer and at the same time also the weight in grams of the skein of standard length attached to the hook 12. I provide on the segment 1 also a number corresponding to this length, said number being arranged within the same arc as scale 19 and forming a part of a column 20 of numbers, which is arranged radially relatively to the pivot of the beam 11. Each number of this column 20 corresponds to a certain length expressed in meters. The relation between the division numbers of the scales 21 provided on both sides of the scale 19 and the division numbers of the latter lying on the same radial line as said division numbers of scales 21 corresponds to the relation between the standard length given for the scale 19 and lying in column 20 and the lengths expressed by those numbers of this column 20, which correspond to said scales 21.

Standard 3 carries also a hygrometer 22 and a thermometer 23.

The hereinbefore described balance may be used and works as follows:

Let it be assumed, that a skein attached to hook 12 moves—owing to its weight—the balance beam 11 into the position shown in Fig. 1. In this case the skein has a titer of 36, assumed that this skein has standard length, that is, if the skein has a length of 9000 meters. If the skein has, however, a length of 18000 meters, the titer of the skein is =18.

As silk is very hygroscopic, the relative weight of the same depends also on the humidity of the atmosphere, so that the weight of the skeins may be subjected to great differences. It is, therefore, necessary to provide means permitting an adjustment of the balance segment 1 in accordance with the humidity of the air, as otherwise the numbers read off the scales upon a weighing of the skein could not be regarded as quite accurate. To this end I provide means adapted to turn the balance segment 1 about a horizontal line for the purpose of adjusting this segment, so that the zero-position of the balance beam 11 may be adjusted in accordance with the degree of humidity by means of the mark-lines 15. The adjustment of the scale segment 1 is effected by means of an adjustment of the screw 7 and the winged nut 9, the screw 7 being to this end tightened and the nut 9 released or vice versa. On the effecting of such an adjustment the plate 4 is brought into an inclined position relatively to the base-plate 6 and the standard 3 is also moved into an inclined position, so that the zero-position of the balance beam changes relatively to the mark-lines 15. The degree of humidity of the atmosphere determining the degree of inclination of the standard 3 may be read off the hygrometer 22.

The scale 18 permits to ascertain in % the ratio of increase or decrease in weight of a skein, if the skein has at first a weight of 36 grams. Such a decrease or increase of the weight between two succeeding weighing operations may occur, for instance, if the silk has been subjected in the meantime to a certain treatment (charging, scouring, dyeing). Should the weight of the skein to be examined surpass before the treatment of this skein the standard weight or should it be smaller than the latter, the percentage of the increase or decrease in weight, to which the skein has been subjected during the treatment, may be easily ascertained by reducing the weight reading. When a very large number of skeins has to be examined and when the average weights, which these skeins had before and also after the change, are known, the percentage of the weight-difference with regard to the standard weight may be read off the scale by means of the member 13 in a similar manner as in a slide-rule.

The weight of the skeins in grams has always to be read off the scale 19, which indicates the numbers for the titers and at the same time also the weight of the skeins in grams. If it is assumed, for instance, that a skein having a length of 9000 meters has a titer of 30, the skein has in this case also a weight of 30 grams. If, on the other hand, it is assumed, that the skein has a length of 18000 meters and that the end 13 of the balance beam 11 indicates in that of scale 21, which corresponds to this length of the skein, that the titer of the latter is =18, a look on scale 19 shows also that the skein has a weight of 36 grams. If a skein having a length of 4500 meters has a titer of 61, the scale 19 shows that this skein has a weight of 30.5 grams.

As already stated, it is very important to consider during the titration of the silk also the humidity of the atmosphere. Consequently it has to be taken into consideration, that according to the general recognized rule for ascertaining the commercial weight it is assumed, that each 10% difference in the humidity-content correspond to the difference of 1% in the weight and that a humidity of 55° is considered as that corresponding to normal conditions. With due regards to these facts the hereinbefore described balance may be used as follows:

Let it be assumed, that the hygrometer indicates a humidity of 85°. In this case, the balance segment 1 has to be turned in such a manner, that the middle line of the balance beam 11 coincides exactly in the zero-position with that mark-line 15, which corresponds to a humidity degree of 85, that is, with the line, which in Fig. 2 bears the number 85. The mark-lines 15 are arranged in such a manner, that the distance between two such lines corresponds exactly to that turning of the balance beam 11, which is brought about by a weight of 0.36 grams (=1% of the weight of 36 grams). By means of such an adjustment of the scale in accordance with the degree of humidity of the air it is thus always possible to bring the readings approximatively in accordance with the conditions of humidity of the air.

The hereinbefore described balance presents the advantage with regard to the hitherto used titration methods, according to which only samples of the skeins are subjected to a titration, that it permits weighing the whole of the silk, that is to say whole skeins, so that the results obtained by using such a balance are much more accurate, than those obtained by proceeding according to said methods.

According to the modification shown in Fig. 3 I provide in the arm 10 a movable pivot 26, to which I secure the balance beam 11 and a thin rod 24 carrying an adjustable weight 25. In this case, the mark-lines 15 are arranged at a suitable place on both sides of the radial line passing through the pivot 26 and the division line 36 of scale 19. By means of this weight 25 I am able to compensate in a very accurate manner the influences of the humidity of the air. This may be effected in the following manner. Let it be assumed, that the air has a humidity of 75°, that is 20° more than normal. After the balance has been adjusted in a proper manner, so that the pointer is exactly in the zero-position when no load is put on the scale (see position I in Fig. 3), I put at first on the balance beam 11 a weight of 36 grams (see position II in Fig. 3) and I move then the weight 25 along the rod 24 in the one or other direction until the thread 14 coincides with the division 75 on the scale 15 (see position III in Fig. 3), so that the arm 11 is moved 2% below the 36 grams-position. Upon the carrying out of this adjustment the weight put on the arm 11 is removed and I may now start with the weighing of the silk. In this manner, it is possible to obtain readings, in which the influences of the atmosphere are already taken in due consideration, or in other words, in which said influences are already eliminated.

As the arm 11 of the balance shown in Fig. 3 returns always exactly into the same zero-position, no matter what adjustment of the weight 25 may have been effected, the correction made does not only prove to be right for the 36 grams-position, but for all weights or titers, which have to be ascertained.

As will be seen from the hereinbefore described examples I am able to determine immediately and at any degree of humidity of the air the titer of skeins having ten different lengths (between 4500 and 18000 meters). By means of such a balance it is also very easy to read off the weight with an accuracy of about 0.05 grams. The same balance permits moreover to determine the titer and the weight of dyed or scoured skeins having ten different lengths, so that the balance forming the subject-matter of this invention forms a very cheap, light and handy device adapted to be used by silk manufacturers for determining at any time the titer of the silk.

What I claim is:

1. A balance for determining the standard of silk, comprising a standard, a segment thereon having a plurality of concentric rows of scale divisions thereon, each scale row corresponding to a definite length of silk, a pivoted beam operating simultaneously as a pointer for said scale and a carrier for the silk, one end of said beam movable over said rows of scale divisions and means for adjusting the beam and segment relatively one to the other to compensate for atmospheric humidity, and means for tilting the standard and its attached segments to adjust the pointer to zero-reading.

2. A balance for determining the titer of silk, comprising a standard, a balance arm pivotally mounted on said standard and acting simultaneously as a pointer, means on said arm for attaching the skeins to be examined, an annular segment concentric to the pivot of said arm and having a plurality of concentric scales each corresponding to a definite length of a skein and the division of these scales being such that the titer may be read off the scale corresponding to the length of the skein, said segment also provided near the zero position of the balance beam with a humidity adjusting scale, and means adapted to adjust the balance arm relatively to the annular segment with respect to said humidity scale in accordance with the degree of humidity of the air, substantially as described.

3. A balance for determining the titer of silk, comprising a standard, a balance arm pivotally mounted on said standard and acting simultaneously as a pointer, means on said arm for attaching the skeins to be examined, an annular segment concentric to the pivot of said arm and having a plurality of concentric scales thereon, each of said scales corresponding to a definite length of silk and the divisions of these scales being such that the titer may be read off the scale corresponding to a length of silk that is to be examined, by means of said pointer, said segment also provided near the zero position of the balance beam with a humidity adjusting scale, a hygrometer carried by said standard and means adapted to adjust the balance arm relatively to the annular segment in accordance with the degree of humidity of the air, substantially as described.

4. A balance for determining the titer of silk, comprising a standard, a pivot movable in said standard, a balance arm fixed to said pivot and acting simultaneously as a pointer, a hook connected to this arm, a rod fixed to said pivot, an adjustable weight on this rod, an annular segment concentric to said pivot and having a plurality of concentric scales thereon, each scale corresponding to a definite length of silk and the division of these scales being such that the titer may be read off the scale corresponding to the length of silk being examined by means of said pointer, said segment also provided near the zero-position of the balance beam with a humidity scale, and a hygrometer carried by said standard, said adjustable weight permitting to adjust the balance arm relatively to the annular segment by means of said humidity scale in accordance with the degree of humidity of the air, substantially as described.

In testimony that I claim the foregoing as my invention, I have signed my name in presence of two subscribing witnesses.

ALBERT BRUNNER.

Witnesses:
 CARL GUBLER,
 ARNOLD LEHNER.

Copies of this patent may be obtained for five cents each, by addressing the "Commissioner of Patents, Washington, D. C."